(12) United States Patent
Chang et al.

(10) Patent No.: US 10,996,470 B2
(45) Date of Patent: May 4, 2021

(54) HEAD-UP DISPLAY LIGHT TRAP

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/418,574

(22) Filed: May 21, 2019

(65) Prior Publication Data

US 2020/0371351 A1 Nov. 26, 2020

(51) Int. Cl.
| | |
|---|---|
| *G02B 27/01* | (2006.01) |
| *G03B 21/62* | (2014.01) |
| *G03B 21/14* | (2006.01) |
| *B60K 35/00* | (2006.01) |
| *G02B 27/09* | (2006.01) |

(52) U.S. Cl.
CPC .......... *G02B 27/0101* (2013.01); *B60K 35/00* (2013.01); *G02B 27/0972* (2013.01); *G03B 21/142* (2013.01); *G03B 21/62* (2013.01); *B60K 2370/334* (2019.05); *G02B 2027/014* (2013.01)

(58) Field of Classification Search
CPC ............ G02B 27/0101; G02B 27/0972; G02B 2027/014; G02B 27/01; G02B 2027/012; G02B 2027/011; B60K 35/00; B60K 2370/334; B60K 2370/1529; G03B 21/142; G03B 21/62
See application file for complete search history.

(56) References Cited

U.S. PATENT DOCUMENTS

| | | | | |
|---|---|---|---|---|
| 4,978,214 | A * | 12/1990 | Kawata | G02B 27/0101 353/114 |
| 2008/0049331 | A1* | 2/2008 | Nakamura | G02B 27/0101 359/630 |
| 2008/0192358 | A1* | 8/2008 | Watanabe | G02B 27/0101 359/633 |
| 2016/0089978 | A1* | 3/2016 | Takahashi | G02B 5/0221 359/599 |
| 2017/0052368 | A1* | 2/2017 | Takahashi | G02B 27/01 |
| 2017/0052372 | A1* | 2/2017 | Takahashi | B60K 35/00 |
| 2017/0059864 | A1* | 3/2017 | Takahashi | B60K 35/00 |
| 2017/0131548 | A1* | 5/2017 | Wunderlich | G02B 27/0101 |
| 2018/0017794 | A1* | 1/2018 | Zeh | G02B 27/0149 |
| 2018/0356634 | A1* | 12/2018 | Riebe | G02B 27/0101 |
| 2020/0143184 | A1* | 5/2020 | Naradikian | G02B 27/0101 |

* cited by examiner

*Primary Examiner* — Temesghen Ghebretinsae
*Assistant Examiner* — Ivelisse Martinez Quiles

(57) ABSTRACT

A head-up display (HUD) system for a vehicle comprises a windshield, a projector adapted to project an image onto an inner surface of the windshield, a HUD glare trap lens positioned between the projector and the windshield, the HUD glare trap lens adapted to allow the projected image to pass through the HUD glare trap lens to the inner surface of the windshield, and to reflect sunlight that passes through the windshield to the HUD glare trap lens, and a light trap adapted to deflect sunlight that passes through the windshield and is reflected by the HUD glare trap lens, to prevent the reflected sunlight from interfering with the HUD image projected onto the windshield.

8 Claims, 3 Drawing Sheets

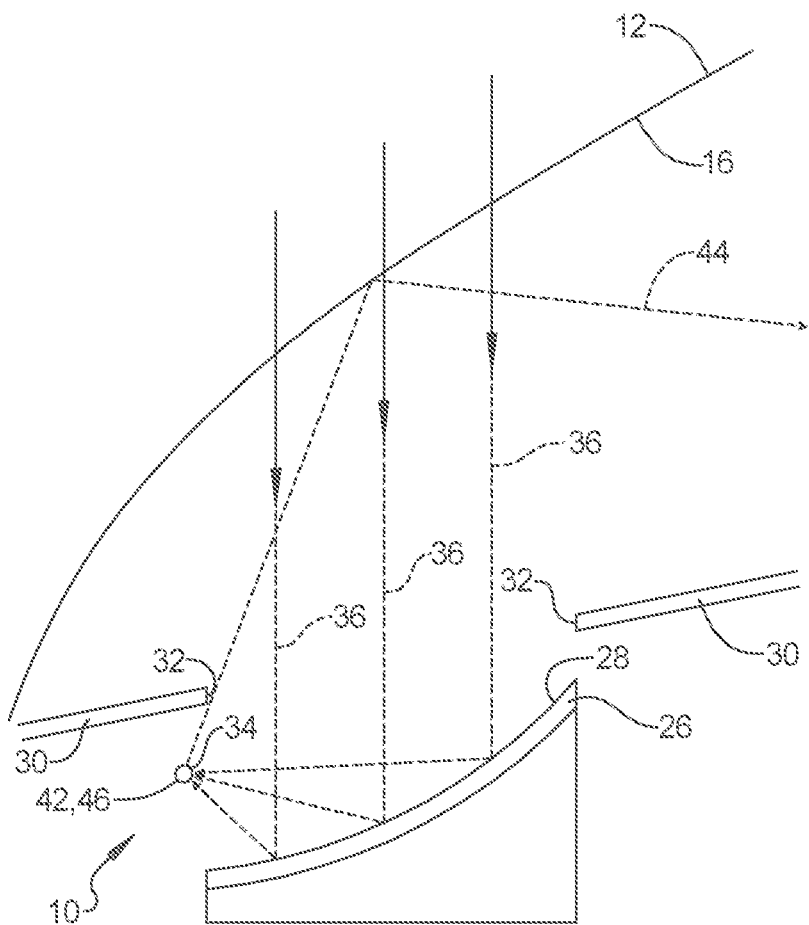
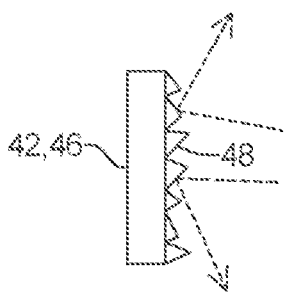
FIG. 3
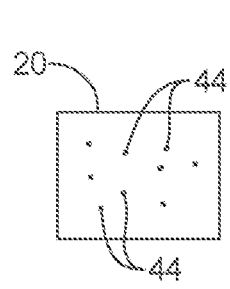
FIG. 4a
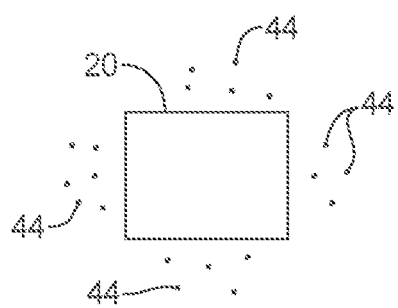
FIG. 4b

HEAD-UP DISPLAY LIGHT TRAP

INTRODUCTION

The present disclosure relates to a head-up display (HUD) for a vehicle. In current HUD glare trap lens designs, the curvature of the lens is to reflect and focus the sunlight at a line in space, which is called a focal bar, and ideally use an absorptive material to absorb the focused light. However, due to material limitations, the surface at which the sunlight is focused cannot absorb the sunlight completely and becomes a Lambertian surface. The sunlight not absorbed by the surface reflects back to the driver's eye and causes glare. This must be considered while designing the glare trap lens. The curvature and tilt angle must be designed to ensure the reflected light is outside the eye-box. Designing the glare trap lens with these considerations in mind increases the overall size of the HUD.

Thus, while current HUD systems achieve their intended purpose, there is a need for a new and improved HUD system that reduces or eliminates sunlight being reflected back within the eye-box.

SUMMARY

According to several aspects of the present disclosure, a head-up display (HUD) system for a vehicle comprises a windshield, a projector adapted to project an image onto an inner surface of the windshield, a HUD glare trap lens positioned between the projector and the windshield, the HUD glare trap lens adapted to allow the projected image to pass through the HUD glare trap lens to the inner surface of the windshield, and to reflect sunlight that passes through the windshield to the HUD glare trap lens, and a light trap adapted to deflect sunlight that passes through the windshield and is reflected by the HUD glare trap lens, to prevent the reflected sunlight from interfering with the HUD image projected onto the windshield.

According to another aspect of the present disclosure, the HUD glare trap lens has a curved reflective top surface.

According to another aspect of the present disclosure, the HUD glare trap lens is mounted below the surface of an instrument panel within the automobile, wherein the projected image passes through the HUD glare trap lens and through an opening formed within the instrument panel to the inner surface of the windshield.

According to another aspect of the present disclosure, the projected image is reflected by the inner surface of the windshield toward a driver of the automobile, within an eye-box, wherein the eye-box defines a three-dimensional virtual space within which the HUD image is visible to the driver of the automobile.

According to another aspect of the present disclosure, the curved reflective top surface of the HUD glare trap lens reflects sunlight that passes through the windshield to a focal bar.

According to another aspect of the present disclosure, the focal bar is a virtual horizontal line in space, wherein the light trap is positioned on the focal bar.

According to another aspect of the present disclosure, the focal bar has a width and a length, wherein the length of the focal bar is less than or equal to the width of the HUD glare trap lens.

According to another aspect of the present disclosure, the light trap is adapted to redirect sunlight that passes through the windshield and is reflected by the top surface of the HUD glare trap lens, such that substantially all of the sunlight deflected back to the inner surface of the windshield by the light trap is reflected by the inner surface of the windshield outside of the eye-box.

According to another aspect of the present disclosure, the light trap comprises a prism adapted to redirect sunlight reflected to the light trap by the top surface of the HUD glare trap lens.

According to another aspect of the present disclosure, the prism type light trap is made from one of plastic or glass.

According to another aspect of the present disclosure, the prism type light trap includes a non-Lambertian reflective surface.

According to another aspect of the present disclosure, the light trap is adapted to absorb the sunlight that passes through the windshield and is reflected by the top surface of the HUD glare trap lens.

According to another aspect of the present disclosure, the light trap is substantially horn shaped and hollow, includes an opening and defines an inner surface, wherein the light trap is positioned with the opening located at the focal bar and facing the HUD glare trap lens, such that sunlight passing through the windshield is reflected by the top surface of the HUD glare trap lens into the opening of the light trap.

According to another aspect of the present disclosure, the inner surface of the light trap is adapted to reflect sunlight that enters the opening deeper into the horn shaped light trap.

According to another aspect of the present disclosure, the inner surface of the light trap provides specular reflectance of light hitting the inner surface of the light trap.

According to another aspect of the present disclosure, the light trap has a tip formed at a distal end, opposite the opening, wherein the tip includes a light absorbing material.

According to another aspect of the present disclosure, the light trap has a tip formed at a distal end, opposite the opening, wherein the tip includes an exit to allow light reflected into the light trap to escape from the light trap and be directed away from the opening in the instrument panel.

According to another aspect of the present disclosure, the opening of the light trap is one of circular, oval, and rectangular in shape.

According to several aspects of the present disclosure, a head-up display (HUD) system for an automobile comprises a windshield, a projector adapted to project an image onto an inner surface of the windshield, wherein the projected image is reflected by the inner surface of the windshield toward a driver of the automobile, within an eye-box, wherein the eye-box defines a three-dimensional virtual space within which the HUD image is visible to the driver of the vehicle. A HUD glare trap lens is positioned between the projector and the windshield and mounted below the surface of an instrument panel within the automobile, the HUD glare trap lens adapted to allow the projected image to pass through the HUD glare trap lens and through an opening formed within the instrument panel to the inner surface of the windshield, and including a curved reflective top surface to reflect sunlight that passes through the windshield to the HUD glare trap lens. A focal bar, wherein the focal bar is a virtual horizontal line in space having a width and a length, wherein the length of the focal bar is less than or equal to the width of the HUD glare trap lens, further wherein the curved reflective top surface of the HUD glare trap lens is adapted to reflect sunlight that passes through the windshield to the focal bar. A light trap is positioned at the focal bar, the light trap adapted to redirect the sunlight that passes through the windshield and is reflected by the HUD glare trap lens, to prevent the reflected sunlight from interfering with the HUD image projected onto the inner surface of the windshield.

According to several aspects of the present disclosure, the light trap is one of a prism having a non-Lambertian surface adapted to redirect sunlight reflected to the prism by the top surface of the HUD glare trap lens, such that substantially all of the sunlight deflected back to the inner surface of the windshield by the prism is reflected by the inner surface of the windshield outside of the eye-box, and a substantially horn shaped and hollow structure, including an opening and defining an inner surface, wherein the light trap is positioned with the opening located at the focal bar and facing the HUD glare trap lens, such that sunlight passing through the windshield is reflected by the top surface of the HUD glare trap lens into the opening of the light trap and the inner surface of the light trap provides specular reflectance and is adapted to reflect sunlight that enters the opening deeper into the light trap, further wherein the light trap has a tip formed at a distal end, opposite the opening, the tip including one of a light absorbing material and an exit to allow light reflected into the light trap to escape from the light trap and be directed away from the opening in the instrument panel.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a side sectional view of a portion of the head-up display shown in FIG. 1 according to an exemplary embodiment;

FIG. 3 is a side view of a prism of the head-up display shown in FIG. 2;

FIG. 4a is a schematic view illustrating sunlight being reflected within an eye-box of the head-up display shown in FIG. 2;

FIG. 4b is a schematic view illustrating sunlight being reflected outside of an eye-box of the head-up display shown in FIG. 2;

DETAILED DESCRIPTION

Figure 1:
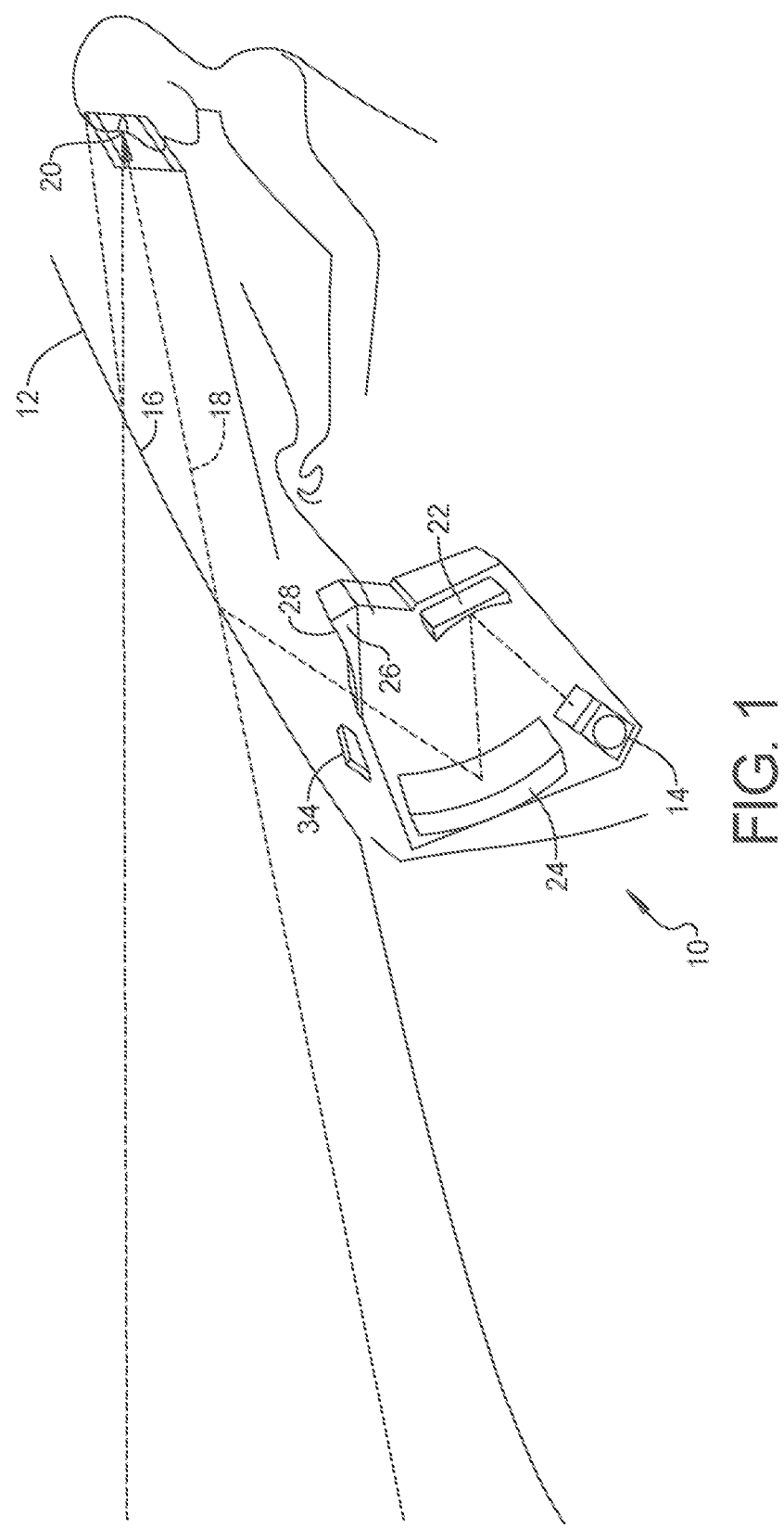
FIG. 1 is a schematic illustration of a head-up display system for an automobile according to an exemplary embodiment.

The following description is merely exemplary in nature and is not intended to limit the present disclosure, application, or uses. Referring to FIG. 1, a schematic illustration of a head-up display (HUD) system 10 for vehicle is shown. The system may be used in any type of vehicle, including but not limited to, motorcycles, trucks, sports utility vehicles (SUVs), recreational vehicles (RVs), marine vessels, aircraft including unmanned aerial vehicles (UAVs), etc. The HUD system 10 comprises a windshield 12 and a projector 14 adapted to project an image predominantly onto an inner surface 16 of the windshield 12. The image is reflected by the inner surface 16 of the windshield 12 toward a driver of the vehicle, as indicated by arrow 18. The image is reflected toward the driver of the automobile within an eye-box 20, wherein the eye-box 20 defines a three-dimensional virtual window within which the HUD image is visible to the driver of the automobile.

Modern HUD eye-boxes for automobiles are usually about 150 mm by 150 mm. This allows the driver some freedom of head movement but movement too far up/down left/right will cause vignetting of the projected virtual image. The driver of the automobile is able to view the entire image as long as one of the driver's eyes is inside the eye-box 20.

The projector 14 emits an image that is reflected between a plurality of mirrors 22, 24 before being directed upward to the inner surface of the windshield, as indicated by arrow 18. In the exemplary embodiment shown in FIG. 1, the projector 14 emits an image to a fold mirror 22. The fold mirror 22 is adapted to flip the image that is being projected so the image appears at the proper orientation on the inner surface 16 of the windshield 12. The fold mirror 22 is a planar mirror that simply flips the image and does not distort the image. The image is reflected from the fold mirror 22 to a rotatable aspherical mirror 24. The aspherical mirror 24 is rotatable to allow the position of the image that is projected onto the inner surface 16 of the windshield 12 to be adjusted either side to side or up and down. This allows a driver of the automobile to adjust the position of the eye-box 20 to accommodate driver seating heights and make sure the driver can clearly see the HUD image while driving the automobile.

The aspherical mirror 24 further serves the purpose of magnifying the image to a size suitable for the driver of the automobile to see the image clearly. The spherical mirror 24 then reflects the image on the optical component of the windshield 12, The shape of the aspherical mirror 24 is carefully tailored to compensate the distortion caused by the shape of the windshield 12 and manufactured to rigorous standards to insure that the image reflected by the aspherical mirror 24 onto the inner surface 16 of the windshield 12 is clear and without distortion. There is some reflection from the outer surface of the windshield 12.

A HUD glare trap lens 26 is positioned between the projector 14 and the windshield 12. The image is reflected from the aspherical mirror 24 upward to the HUD glare trap lens 26. The HUD glare trap lens 26 is adapted to allow the projected image to pass through the HUD glare trap lens 26 to the inner surface 16 of the windshield 12. In addition, the HUD glare trap lens 26 is adapted to reflect sunlight that passes through the windshield 12 to the HUD glare trap lens 26. The HUD glare trap lens 26 includes a curved top surface 28 that is reflective. The HUD glare trap lens 26 is mounted below the surface of an instrument panel 30 within the automobile. The projected image passes through a HUD box package and the HUD glare trap lens 26 and through an opening 32 formed within the instrument panel 30 to the inner surface 16 of the windshield 12.

Referring to FIG. 2, the curved reflective top surface 28 of the HUD glare trap lens 26 is adapted to reflect sunlight that passes through the windshield 12 to a focal bar 34, as indicated by arrows 36. The focal bar 34 is a virtual horizontal line in space that has a width 38 and a length 40. The length 40 of the focal bar 34 is less than or equal to a width of the HUD glare trap lens 26. The width 38 of the focal bar 34 is tailored such that the width 38 and length 40 of the focal bar 34 defines a two-dimensional window through which substantially all of the sunlight that is incident upon the top surface 28 of the HUD glare trap lens 26 is reflected.

A light trap 42 is positioned in proximity to the HUD glare trap lens 26 and is adapted to redirect sunlight that passes through the windshield 12 and is reflected by the HUD glare trap lens 26. Redirection of the sunlight by the light trap 42 prevents the reflected sunlight from interfering with the HUD image projected onto the windshield 12. The light trap 42 is positioned on the focal bar 34 and is aligned with the eye-box 20.

Referring to FIG. 2, FIG. 3, FIG. 4a, and FIG. 4b, in an exemplary embodiment of the present disclosure, the light trap 42 is adapted to redirect sunlight that passes through the windshield 12 and is reflected by the top surface 28 of the HUD glare trap lens 26. Without being redirected, sunlight 44 reflecting back to the surface 16 of the windshield 12 by conventional light absorbing means would be reflected to the eye-box 20, as shown in FIG. 4a. This reflected sunlight 44 causes glare and interference with the image of the HUD system 10.

In an exemplary embodiment of the present disclosure, the light trap 42 comprises a prism 46 adapted to redirect sunlight 44 reflected to the light trap 42 by the top surface 28 of the HUD glare trap lens 26. The prism 46 includes a non-Lambertian reflective surface 48, that provides specular reflection and redirect the sunlight 44, as shown in FIG. 3. Additionally, the reflective surface 48 of the prism 46 may provide some light absorption. Each surface interaction has some probability of absorption of light. Because of the high number of surface interactions, the light becomes extinguished by the absorption as it traverses through the horn. The nature of the prism 46 ensures that substantially all of the sunlight 44 reflected back to the surface 16 of the windshield 12 by the prism 46 is reflected outside of the eye-box 20, as shown in FIG. 4b. In an exemplary embodiment, the prism 46 is made from glass or plastic, however, it should be understood by those skilled in the art that the prism 46 could be made from other materials with suitable reflective and light transmission qualities.

Figure 5:
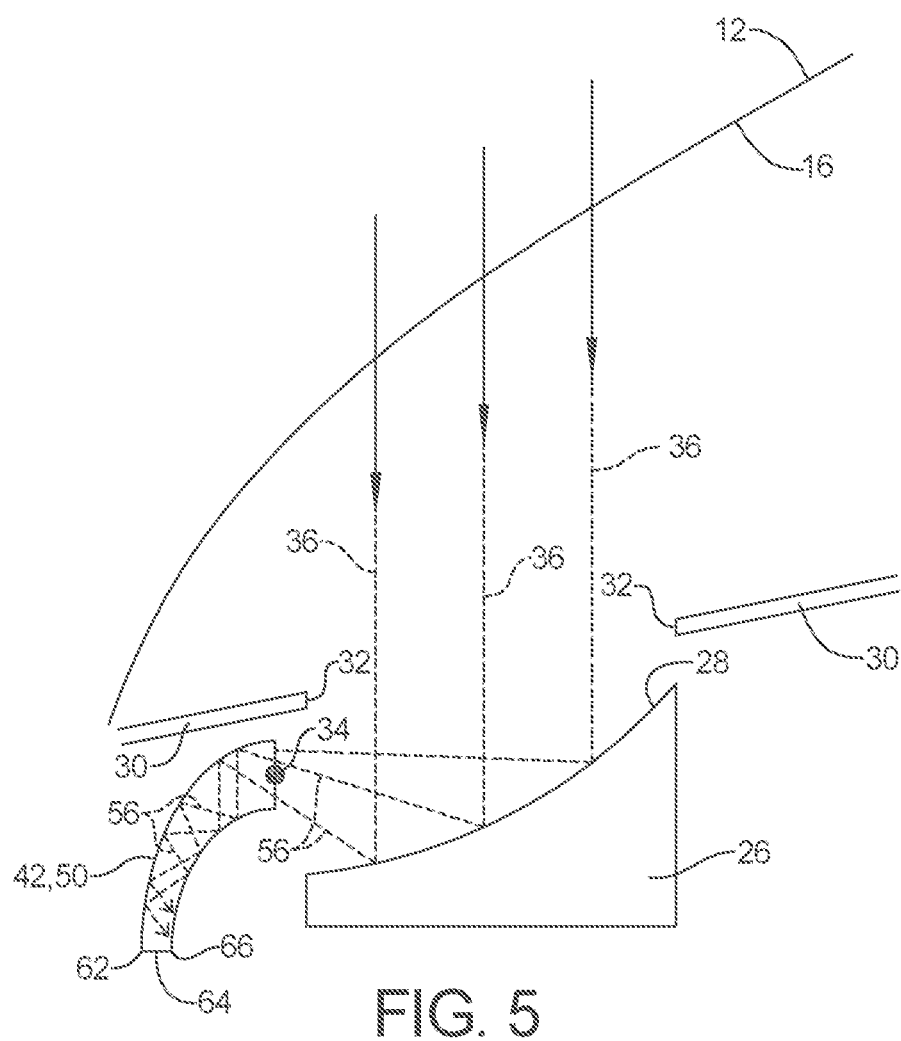
FIG. 5 is a side sectional view of a portion of the head-up display shown in FIG. 1 according to another exemplary embodiment.
Figure 6:
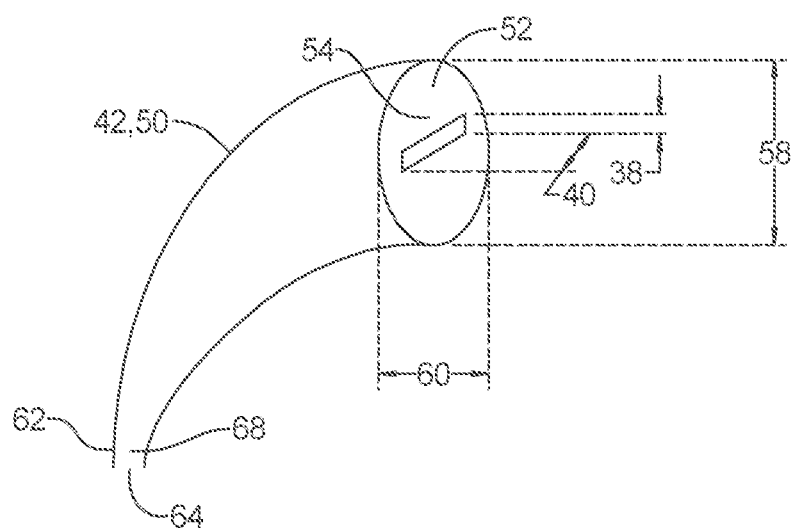
FIG. 6 is an enlarged view of the light trap of the head-up display shown in FIG. 5.

Referring to FIG. 5 and FIG. 6, in another exemplary embodiment, the light trap 42 is adapted to prevent sunlight 44 that passes through the windshield 12 and is reflected by the top surface 28 of the HUD glare trap lens 26 from passing upward through the opening 32 of the instrument panel 30 to the surfaces of windshield 12. The exemplary embodiment shown in FIG. 5 and FIG. 6, includes a light trap 42 comprising a substantially horn shaped and hollow structure 50. As shown, the horn shape is substantially conical and curved. It should be understood by those skilled in the art that the exact shape of the horn may vary according to the specific application. The horn structure 50 includes an opening 52 and defines an inner surface 54. The horn structure 50 is positioned with the opening 52 located at the focal bar 34 and facing the HUD glare trap lens 26, so the opening 52 provides an entrance for sunlight light 44 to pass into the horn structure 50. Sunlight 44 passing through the windshield 12 is reflected by the top surface 28 of the HUD glare trap lens 26 into the opening 52 of the horn structure 50, as indicated by arrows 56.

Referring to FIG. 6, the size of the opening 52 in the horn structure 50 is large enough to ensure that substantially all of the sunlight 44 reflected by the top surface 28 of the HUD glare trap lens 26 enters the opening 52. In an exemplary embodiment, a height 58 of the opening 52 is at least 100% the width 38 of the focal bar 34, and the width 60 of the opening 52 is at least 100% the length 40 of the focal bar 34.

The opening 52 of the horn structure 50 may be circular, oval or rectangular depending on the design of the focal bar 34.

The inner surface 54 of the horn structure 50 is adapted to reflect sunlight that enters the opening 52 deeper into the horn structure 50 toward the distal end 64. The inner surface 54 provides specular reflection of sunlight hitting the inner surface 54 of the horn structure 50. The shape of horn structure 50 directs the reflected light 56 that enters the opening 52 deeper into the horn structure 50 toward the distal end 64. Additionally, the inner surface 54 of the horn structure 50 may provide some light absorption.

The horn structure 50 includes a tip 62 formed at a distal end 64, opposite the opening 52. The shape of the horn structure 50 is widest at the opening 52 and continuously narrows moving from the opening 52 toward the distal end 64. Referring to FIG. 5, in one exemplary embodiment, the tip 62 includes a light absorbing material 66, such that when light is reflected within the wood's horn 50 to the distal end 64, the light is absorbed, and prevented from reflecting back out of the wood's horn 50. Referring to FIG. 6, in another exemplary embodiment, the tip 62 includes an exit 68 at the distal end 64, such that when light is reflected within the wood's horn 50 to the distal end 64, the light is allowed to escape from the wood's horn 50 and be directed away from the opening 32 in the instrument panel 30.

A HUD system 10 of the present disclosure offers several advantages. The HUD system described herein prevents sunlight from being reflected by the HUD glare trap lens 26 within the eye-box 20. This reduces the amount of glare and interference of the HUD display caused by sunlight.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A head-up display (HUD) system for a vehicle, comprising:
    a windshield;
    a projector adapted to project an image onto an inner surface of the windshield, the projected image reflected by the inner surface of the windshield toward a driver of the vehicle, within an eye-box, wherein the eye-box defines a three-dimensional virtual space within which the projected image is visible to the driver of the vehicle;
    a HUD glare trap lens mounted below a surface of an instrument panel and positioned between the projector and the windshield, the HUD glare trap lens having a curved reflective top surface and adapted to allow the projected image to pass through the HUD glare trap lens and through an opening formed within the instrument panel to the inner surface of the windshield, and to reflect sunlight that passes through the windshield and hits the HUD glare trap lens to a focal bar, wherein the focal bar is a virtual two-dimensional window through which substantially all of the sunlight that is incident upon the curved reflective top surface of the HUD glare trap lens is reflected, the focal bar having a width and a length, wherein the length of the focal bar is less than or equal to a width of the HUD glare trap lens; and
    a light trap positioned on the focal bar, the light trap adapted to redirect sunlight that passes through the windshield and is reflected by the HUD glare trap lens, wherein the light trap is a hollow structure with an opening located at the focal bar, wherein the light trap is adapted to prevent sunlight that passes through the windshield and is reflected by the curved reflective top surface of the HUD glare trap lens from passing upward through the opening of the instrument panel to the inner surface of the windshield.

2. The HUD system of claim 1, wherein the light trap is substantially horn shaped and hollow, includes an opening and defines an inner surface, wherein the light trap is positioned with its opening located at the focal bar and facing the HUD glare trap lens, such that sunlight passing through the windshield is reflected by the curved reflective top surface of the HUD glare trap lens into the opening of the light trap.

3. The HUD system of claim 2, wherein the inner surface of the light trap is adapted to reflect sunlight that enters the opening of the light trap deeper into the light trap.

4. The HUD system of claim 3, wherein the inner surface of the light trap provides specular reflectance of light hitting the inner surface of the light trap.

5. The HUD system of claim 4, wherein the light trap has a tip formed at a distal end, opposite its opening, wherein the tip includes a light absorbing material.

6. The HUD system of claim 4, wherein the light trap has a tip formed at a distal end, opposite its opening, wherein the tip includes an exit to allow light reflected into the light trap to escape from the light trap and be directed away from the opening in the instrument panel.

7. The HUD system of claim 2, wherein the opening of the light trap is one of circular, oval and rectangular in shape.

8. A head-up display (HUD) system for an automobile, comprising:

a windshield;

a projector adapted to project an image onto an inner surface of the windshield, wherein the projected image is reflected by the inner surface of the windshield toward a driver of the automobile, within an eye-box, wherein the eye-box defines a three-dimensional virtual space within which the projected image is visible to the driver of the vehicle;

a HUD glare trap lens positioned between the projector and the windshield and mounted below a surface of an instrument panel within the automobile, the HUD glare trap lens adapted to allow the projected image to pass through the HUD glare trap lens and through an opening formed within the instrument panel to the inner surface of the windshield, and including a curved reflective top surface to reflect sunlight that passes through the windshield and hits the HUD glare trap lens;

a focal bar, wherein the focal bar is a virtual two-dimensional window through which substantially all of the sunlight that is incident upon the curved reflective top surface of the HUD glare trap lens is reflected, the focal bar having a width and a length, wherein the length of the focal bar is less than or equal to a width of the HUD glare trap lens, further wherein the curved reflective top surface of the HUD glare trap lens is adapted to reflect sunlight that passes through the windshield to the focal bar; and a light trap positioned on the focal bar, the light trap adapted to deflect sunlight that passes through the windshield and is reflected by the HUD glare trap lens, to prevent the reflected sunlight from interfering with the projected image projected onto the inner surface of the windshield, the light trap being a substantially horn shaped and hollow structure, including an opening and defining an inner surface, wherein the light trap is positioned with its the opening located at the focal bar and facing the HUD glare trap lens, such that sunlight passing through the windshield is reflected by the curved reflective top surface of the HUD glare trap lens into the opening of the light trap and the inner surface of the light trap provides specular reflectance and is adapted to reflect sunlight that enters the opening of the light trap deeper into the light trap, further wherein the light trap has a tip formed at a distal end, opposite its opening, the tip including one of a light absorbing material and an exit to allow light reflected into the light trap to escape from the light trap and be directed away from the opening in the instrument panel.

* * * * *